(12) United States Patent (10) Patent No.: US 9,200,560 B2
Coldren et al. (45) Date of Patent: Dec. 1, 2015

(54) GASEOUS COMMON RAIL FUEL SYSTEM AND HIGH COMPRESSION RATIO ENGINE USING SAME

(71) Applicant: Caterpillar Inc., Peoria, IL (US)

(72) Inventors: Dana R. Coldren, Secor, IL (US); Cory A. Brown, Peoria, IL (US); Martin L. Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 13/739,115

(22) Filed: Jan. 11, 2013

(65) Prior Publication Data

US 2014/0196686 A1 Jul. 17, 2014

(51) Int. Cl.
*F02B 19/12* (2006.01)
*F02M 21/02* (2006.01)

(52) U.S. Cl.
CPC ............ *F02B 19/12* (2013.01); *F02M 21/0245* (2013.01); *F02M 21/0275* (2013.01); *F02M 21/0281* (2013.01); *Y02T 10/32* (2013.01)

(58) Field of Classification Search
USPC ....... 123/26, 143 B, 259, 275, 292, 299, 435, 123/456, 525, 527
See application file for complete search history.

(56) References Cited

U.S. PATENT DOCUMENTS

| | | | | |
|---|---|---|---|---|
| 4,532,899 A | * | 8/1985 | Lorts ............................... | 123/292 |
| 5,555,868 A | * | 9/1996 | Neumann ...................... | 123/275 |
| 6,073,605 A | * | 6/2000 | Matsuoka et al. ............. | 123/292 |
| 6,209,511 B1 | * | 4/2001 | Goto et al. ...................... | 123/256 |
| 6,360,714 B1 | * | 3/2002 | Kotooka et al. ............... | 123/299 |
| 6,694,944 B2 | | 2/2004 | Agama et al. | |
| 6,953,020 B2 | | 10/2005 | Kojic et al. | |
| 7,140,354 B1 | * | 11/2006 | Hashemi ........................ | 123/456 |
| 7,171,924 B2 | * | 2/2007 | Robel et al. ...................... | 123/26 |
| 7,950,364 B2 | * | 5/2011 | Nerheim ........................ | 123/259 |
| 7,950,370 B2 | * | 5/2011 | Lucas et al. .................... | 123/435 |
| 8,469,009 B2 | * | 6/2013 | Munshi et al. ................. | 123/525 |
| 8,555,852 B2 | * | 10/2013 | Munshi et al. ................. | 123/299 |
| 8,683,979 B2 | * | 4/2014 | Kim et al. ....................... | 123/456 |
| 2010/0132669 A1 | * | 6/2010 | Lee ................................ | 123/456 |
| 2011/0108012 A1 | | 5/2011 | Bryant | |
| 2011/0308489 A1 | * | 12/2011 | Herden ...................... | 123/143 B |
| 2012/0187218 A1 | | 7/2012 | Kim et al. | |
| 2013/0118448 A1 | * | 5/2013 | Kim et al. ....................... | 123/299 |
| 2013/0327296 A1 | * | 12/2013 | Gibson et al. .................. | 123/456 |

FOREIGN PATENT DOCUMENTS

CN 102322332 6/2011
CN 102322332 A * 1/2012

* cited by examiner

*Primary Examiner* — Stephen K Cronin
*Assistant Examiner* — Joshua A Campbell

(57) ABSTRACT

A gaseous fuel engine combines the efficiencies associated with high compression ratio engines with the attractiveness of fueling with natural gas. Each engine cylinder has an associated fuel injector positioned for direct injection and supplied with gaseous fuel from a high pressure common rail. A separate ignition prechamber is also supplied with natural gas and includes an ignition device. Hot gas generated by igniting a mixture of gaseous fuel and air in the prechamber are used to ignite a much larger charge of gaseous fuel injected into the engine cylinder from the fuel injector. The engine has a compression ratio greater than 14: to 1.

18 Claims, 4 Drawing Sheets

GASEOUS COMMON RAIL FUEL SYSTEM AND HIGH COMPRESSION RATIO ENGINE USING SAME

TECHNICAL FIELD

The present disclosure relates generally to gaseous fuel engines, and more particularly to a high compression ratio gaseous fuel engine that utilizes individual ignition prechambers combined with direct gaseous fuel injection.

BACKGROUND

One class of engine that has recently created interest is a dual fuel engine that utilizes a small pilot injection quantity of liquid diesel fuel that is compression ignited to in turn ignite a much larger charge of gaseous fuel supplied to the engine cylinder by direct injection. Such an engine seeks to leverage the efficiencies associated with compression ignition engines with the attractiveness of gaseous fuel. While these types of engines show great promise, they come with an extensive list of new problems associated with supplying individual engine cylinders with two separate fuels. These problems include, but are not limited to control issues, packaging issues and many other problems depending upon the specific hardware chosen and strategies utilized. One example fuel system for an engine of this type is shown in co-owned U.S. Patent application publication US2012/0187218.

The present disclosure is directed toward one or more of the problems set forth above.

SUMMARY

In one aspect, an engine includes an engine housing that defines a plurality of cylinders. A plurality of pistons are each respectively positioned in one of the cylinders, and are movable between a bottom dead center position and a top dead center position that define a compression ratio greater than 14:1. A plurality of fuel injectors are each respectively positioned for direct injection into one of the cylinders. A plurality of ignition prechambers are disposed in the engine housing, and each is respectively fluidly connected to one of the cylinders. A plurality of ignition devices are each respectively positioned in one of the ignition prechambers. A plurality of gaseous fuel supply passage are disposed in the engine housing and each respectively open at one end into one of the ignition prechambers. A gaseous fuel common rail is fluidly connected to each of the fuel injectors.

In another aspect, a method of operating the engine includes moving gaseous fuel into one of the ignition prechambers from a respective one of the gaseous fuel supply passages. Air is compressed in the cylinder in at least a 14:1 ratio by moving one of the pistons from the bottom dead center position to the top dead center position. A mixture of air and gaseous fuel is ignited with one of the ignition devices in the ignition prechamber. Gaseous fuel is injected from one of the fuel injectors directly into the cylinder. Gaseous fuel is moved from the gaseous fuel common rail toward one of the injectors responsive to the injecting step. The injected gaseous fuel is ignited with hot gases pushed from the ignition prechamber into the cylinder responsive to the mixture igniting step.

DETAILED DESCRIPTION

Figure 1:
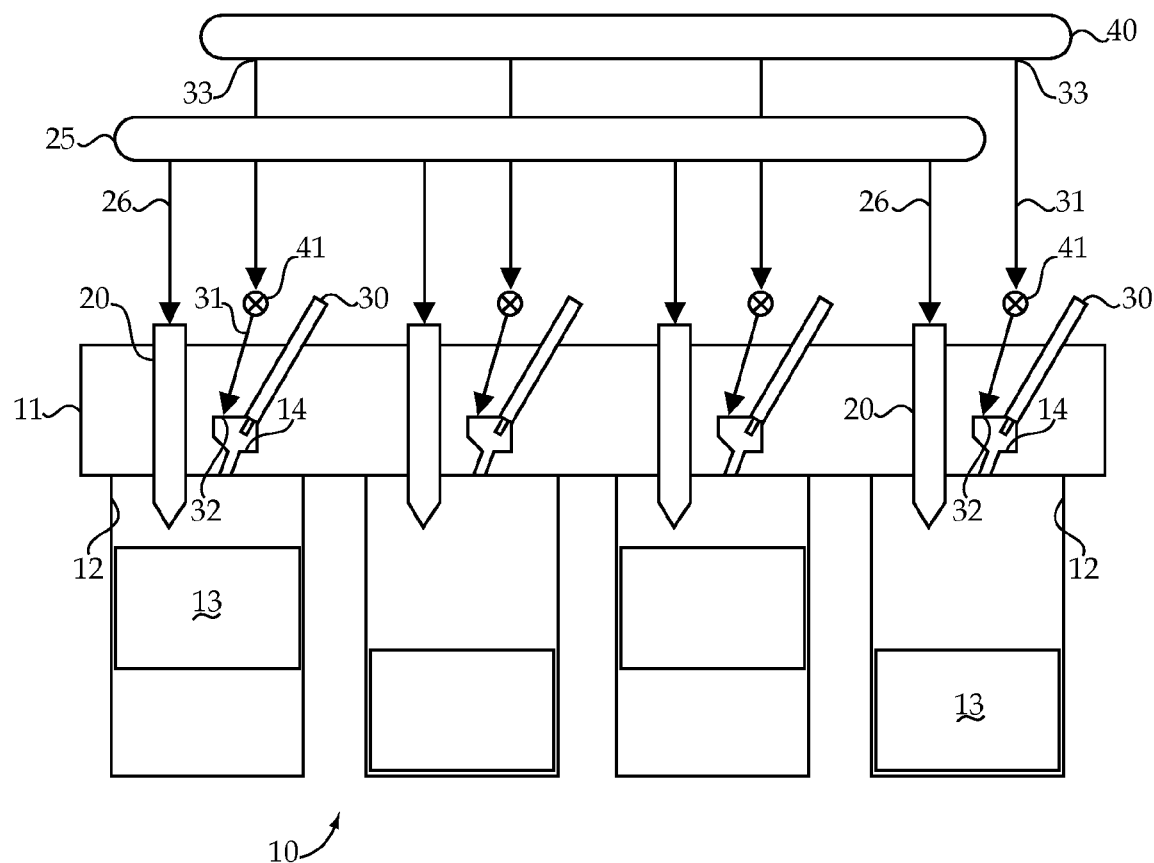
FIG. 1 is a schematic view of an engine according to the present disclosure.
Figure 2:
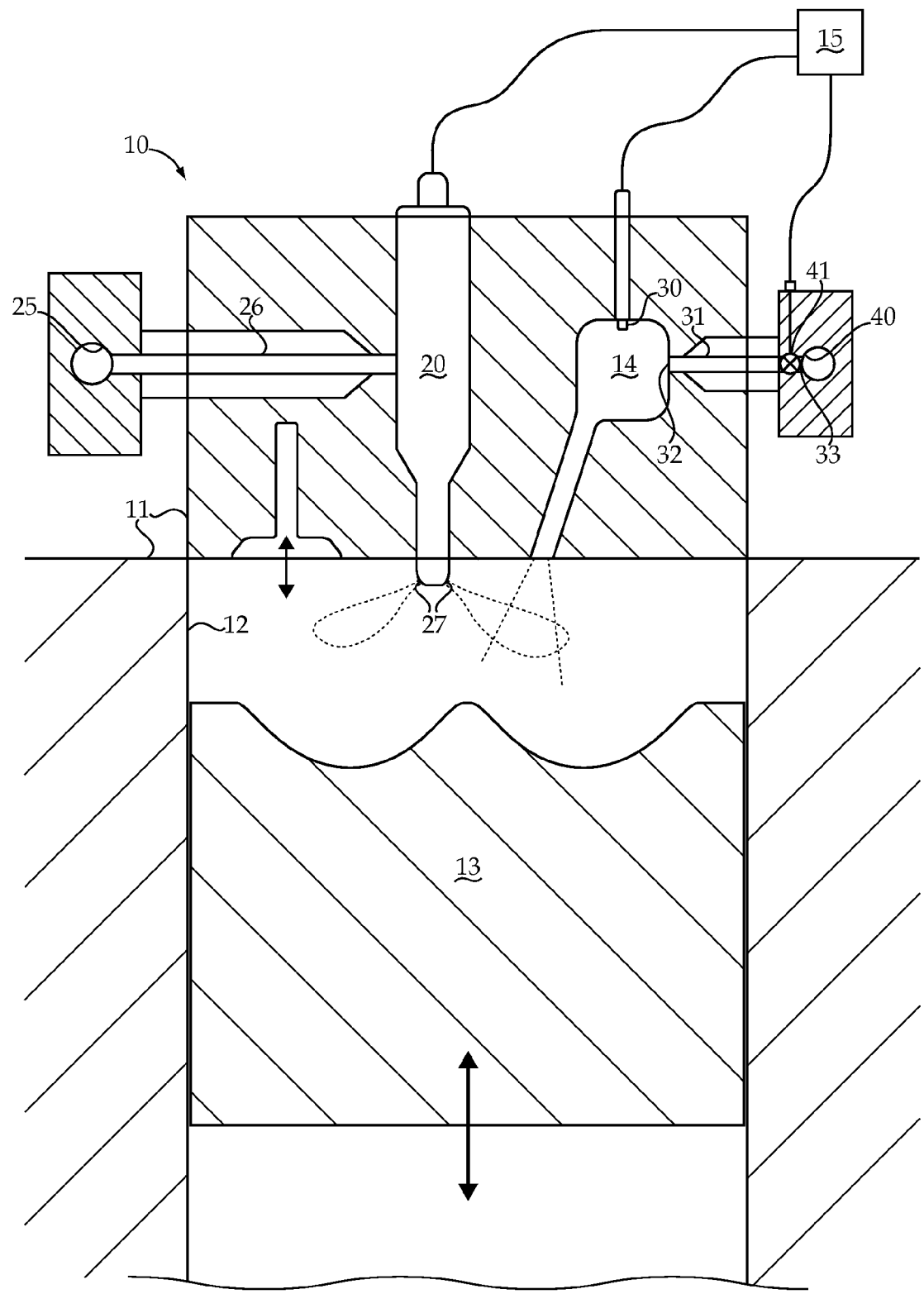
FIG. 2 is a partial sectioned schematic view of the engine of FIG. 1.

Referring initially to FIGS. 1 and 2, an engine 10 includes an engine housing 11 that defines a plurality of cylinders 12. A plurality of pistons 13 are each respectively positioned in one of the cylinders 12. The pistons 13 are movable between a bottom dead center position and a top dead center position that define a compression ratio greater than 14:1. Those skilled in the art will appreciate that this compression ratio relates generally to so called compression ignition engines that often burn liquid diesel fuel in a manner well known in the art. However, the engine of the present disclosure burns only gaseous fuel, which is not compression ignited as would be the case in a diesel fuel engine or a dual fuel engine that utilized diesel fuel for ignition purposes. Instead, the engine 10 of the present disclosure includes a plurality of ignition prechambers 14 that are disposed in housing 11, with each being respectively fluidly connected to one of the cylinders 12. A plurality of ignition devices 30 are each positioned in one of the ignition prechambers 14. A plurality of gaseous fuel supply passages 31 are disposed in the engine housing 11, with each respectively opening at one end 32 into one of the ignition prechambers 14. Although not necessary, an opposite end 33 of each of the gaseous fuel supply passages 31 may be fluidly connected to a low pressure gaseous fuel common rail 40. Engine 10 also includes a plurality of fuel injectors 20 that are each positioned for direct injection into one of the cylinders 12. A high pressure gaseous fuel common rail 25 is fluidly connected to each of the fuel injectors 20. Both the high pressure gaseous fuel common rail 25 and the low pressure gaseous fuel common rail 40 may contain pressurized natural gas. In one specific embodiment, the high pressure gaseous fuel common rail 25 may be maintained at a pressure on the order of maybe 35 MPa, and the low pressure gaseous fuel common rail 40 may be maintained at a substantially lower pressure, such as maybe 1.5 MPa. Depending upon the specific application, the pressures in the two common rails 25 and 40 may vary significantly from the example pressures stated above without departing from the present disclosure. In addition, the gaseous fuel supply passages 31 may be connected to a source of gaseous fuel other than a common rail without departing from the present disclosure.

An electronically controlled admission valve 41 may be located in each of the gaseous fuel supply passages 31 in order to control the timing and volume of gaseous fuel supplied to the individual ignition prechambers 14. Ignition devices 30 may comprise spark igniters, glow plugs, laser igniters, or any other suitable ignition device for igniting a mixture of gaseous fuel and air in the individual prechambers 14. An electronic controller 15 may be in control communication with each of the fuel injectors 20, the ignition devices 30 and the admission valves 41. Although not necessary, the gaseous fuel common rail 25 may be fluidly connected to the individual fuel injectors 20 with a quill 26. Direct injection of gaseous fuel from the individual fuel injectors 20 into the individual cylinders 12 is facilitated by positioning the nozzle outlets 27 of the fuel injectors 20 within the individual cylinders 12. Although not necessary, the gaseous fuel supply passages 31 and the low pressure gaseous fuel common rail 40 may have sufficient capacity to allow engine 10 to operate in a so called limp home mode in the event that a fault develops in the high pressure gaseous fuel supply system preventing the use of fuel injectors 20 for whatever reason. However, during normal operation, one could expect the bulk of the fuel to power engine 10 to be supplied from the individual fuel injectors 20, with that charge being ignited by hot gases ejected from ignition prechambers 14. Ignition of the mixture of gaseous fuel and air in the ignition prechambers 14 is accomplished by energizing an individual one of the ignition devices 30 at a timing controlled by electronic controller 15.

Figure 3:
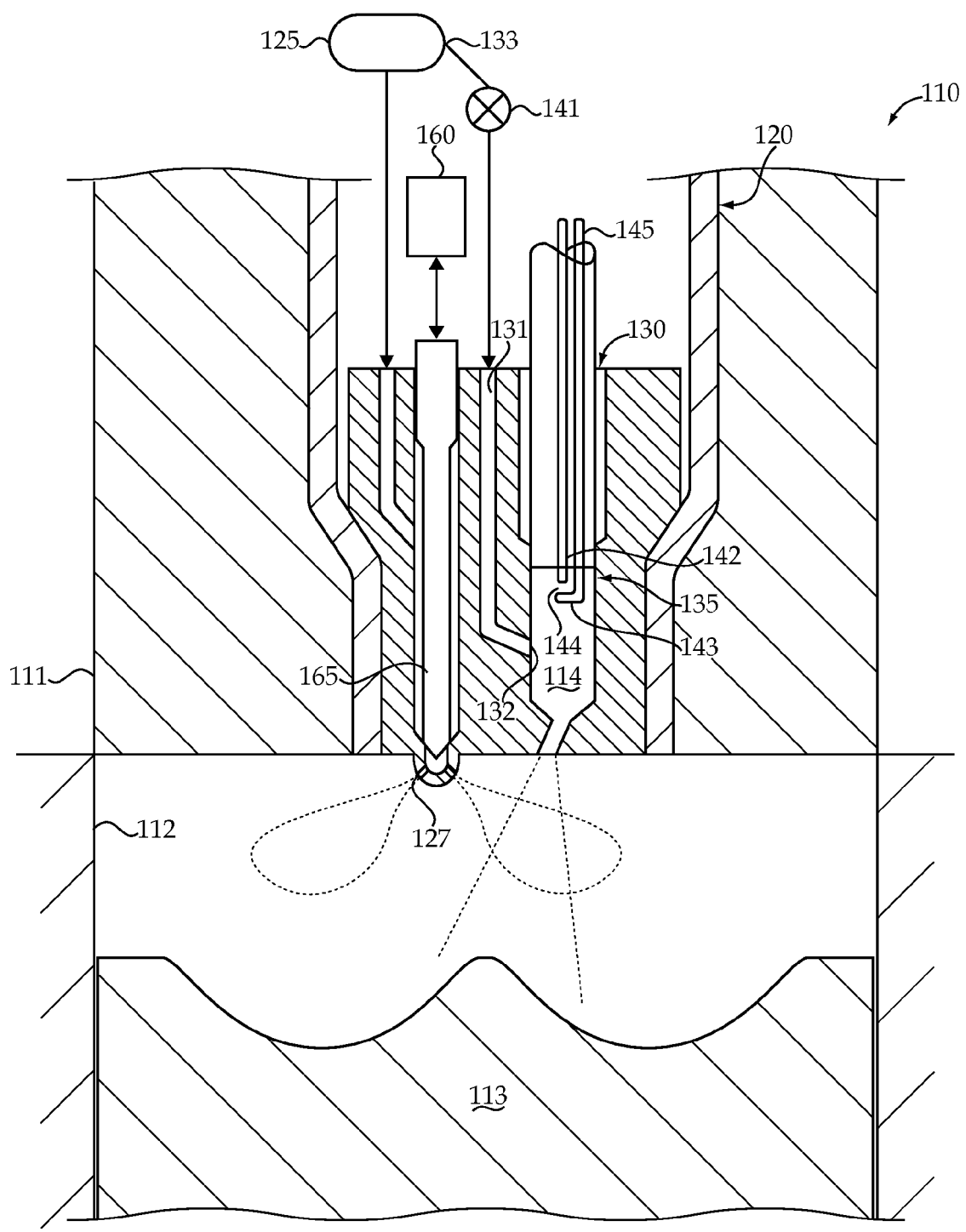
FIG. 3 is a sectioned schematic view of a portion of an engine according to another aspect of the present disclosure.

Referring now to FIG. 3, an engine 110 according to another embodiment of the present disclosure is similar to the engine of FIGS. 1 and 2 except that the ignition prechambers 114 are positioned inside the individual fuel injectors 120 rather than outside of the fuel injectors as shown in the embodiment of FIGS. 1 and 2. In addition, this embodiment is different in that both the nozzle outlets 127 of the fuel injectors 120 and the ignition prechambers 114 are both supplied with gaseous fuel from a high pressure gaseous fuel common rail 125. Engine 110 is similar to the earlier embodiment in that it includes an engine housing 111 that defines a plurality of cylinders 112 (only one shown). A piston 113 reciprocates in each of the cylinders 112 between a bottom dead center position and a top dead center position to define a compression ratio greater than 14:1. Each of the fuel injectors 120 is respectively positioned for direct injection into one of the cylinders 112. The ignition prechambers 114 are disposed within the individual fuel injectors 120, which themselves are disposed in engine housing 111. Each ignition prechamber 114 is also fluidly connected to one of the engine cylinders 112. In this embodiment, the ignition device 130 may comprise a spark igniter 135 with an electrode 142 located a spark gap distance 144 away from a tang 143, which are all located in ignition prechamber 114. Tang 143 may be electrically connected to a low resistance insulated ground wire 145, to avoid unwanted electromagnetic behavior elsewhere in fuel injector 120. The gaseous fuel supply passages 131 are also disposed in engine housing 111 and each has one end 132 opening into the ignition prechamber 114 and an opposite end 133 fluidly connected to the gaseous fuel common rail 125. An electronically controlled admission valve 141 may be located at any suitable location in gaseous fuel supply passage 131. The opening and closing of the nozzle outlets 127 may be facilitated by movement of a needle valve member 165 that may be controlled directly or indirectly by an electronically controlled needle control valve 160 in a manner well known in the art.

Figure 4:
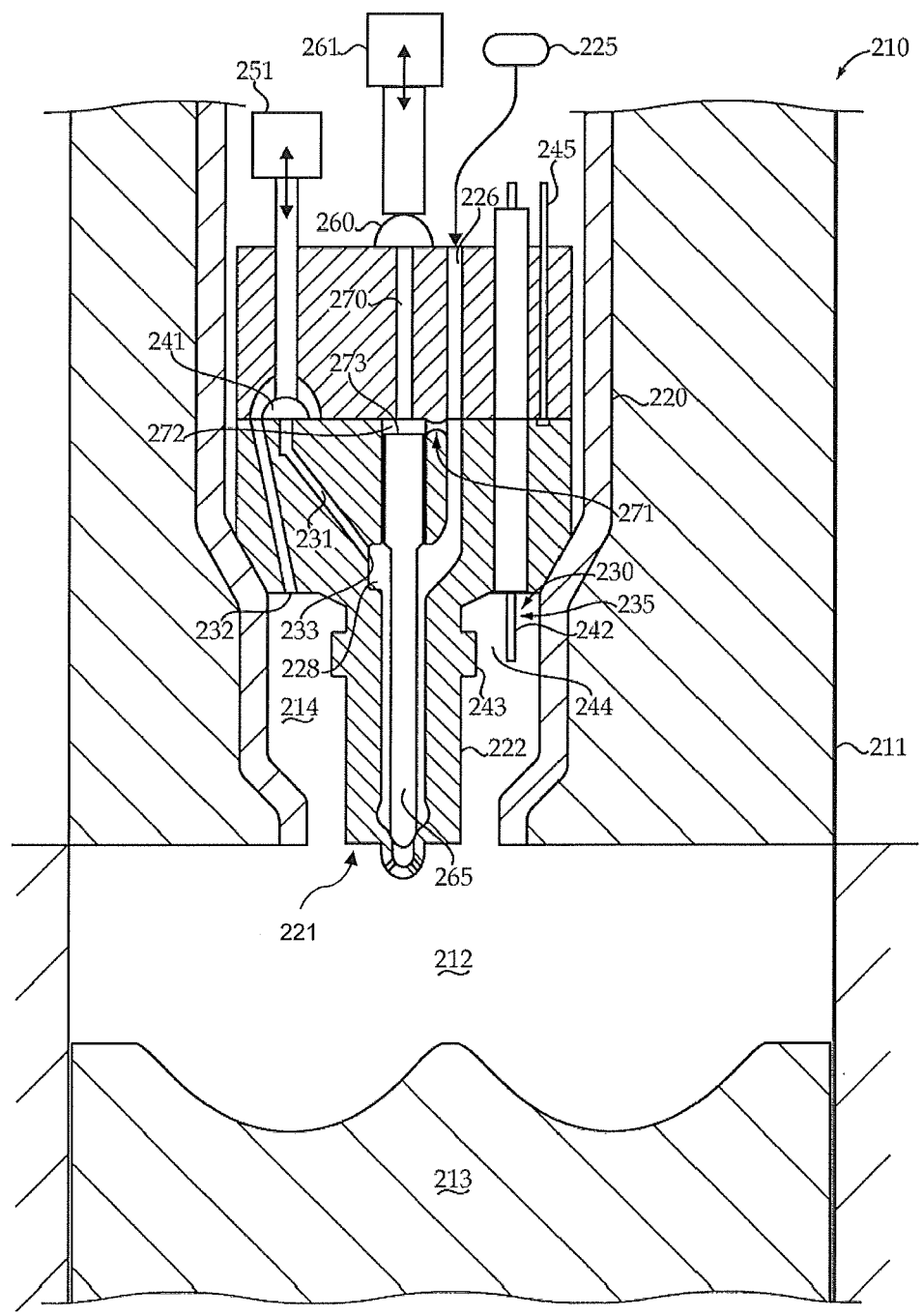
FIG. 4 is a sectioned schematic view of a portion of an engine according to still another aspect of the present disclosure.

Referring now to FIG. 4, still another embodiment of an engine 210 according to the present disclosure is illustrated. This embodiment differs from the previous embodiments by the inclusion of an admission valve 241 within the fuel injector 220 itself, rather than being located elsewhere in the system as in the embodiments of FIGS. 1-3. This embodiment is similar to the embodiment of FIG. 3 in that the gaseous fuel supply passage 231 is fluidly connected to the gaseous fuel common rail 225, rather than fluidly connected to a separate low pressure rail as in the embodiments of FIGS. 1 and 2. This embodiment also differs from the previous embodiments in that the gaseous fuel supply passage 231 is located entirely within the fuel injector 220. Engine 210 includes an engine housing 211 that like the previous embodiment defines a plurality of cylinders 212 (only one shown). A piston 213 is positioned in each cylinder 212 and is moveable between a bottom dead center position and a top dead center position to define a compression ratio greater than 14:1. The fuel injector 220 is positioned for direct injection into the cylinder 212. An ignition prechamber 214 is disposed within each fuel injector 220, which is itself disposed within engine housing 211. As in the previous embodiments, the ignition chamber 214 is fluidly connected to the cylinder 212. An ignition device 230 is positioned in the ignition chamber 214. In particular, in this embodiment, the ignition device 230 is a spark igniter 235 that includes an electrode 242 separated from a tang 243 by a spark gap 244. A tang 243 is exposed on an outer surface 222 of the fuel injector 220. Tang 243 is electronically connected to a low resistance insulated ground wire 245, which may help to avoid unwanted electromagnetic behavior elsewhere in fuel injector 220. This embodiment is also of interest for showing that external surface 222 of tip 221 of fuel injector 220 partially defines that prechamber 214. As in a typical common rail fuel injector, the gaseous fuel common rail 225 is fluidly connected to nozzle chamber 228 by a nozzle supply passage 226. The gaseous fuel supply passage 231 has one end 232 that opens into ignition prechamber 214, and an opposite end 233 that opens into nozzle chamber 228. The opening and closing of admission valve 241 to supply gaseous fuel to ignition prechamber 214 may be controlled by an electrical actuator 251 in a manner well known in the art. This embodiment is similar to the previous embodiment in that fuel injector 220 includes the direct control needle valve that includes a needle valve member 265 with a closing pneumatic surface 273 exposed to fluid pressure in a needle control chamber 272. An electrical actuator 261 may control the opening and closure of control valve 260 to fluidly connect and disconnect needle control chamber 272 to a low pressure drain (not shown) via a control passage 270 in a manner known in the art. Needle control chamber 272 may always be fluidly connected to gaseous fuel common rail 225 via an orifice 271 in a manner that is also familiar to those skilled in the art of direct control needle valves for fuel injectors. The embodiments of FIGS. 3 and 4 may need some tip thermal features, such as tip cooling and/or a thermal coating on the tip 221.

INDUSTRIAL APPLICABILITY

The present disclosure finds general applicability to gaseous fuel engines. The present disclosure finds specific applicability to gaseous fuel engines that seek to leverage the efficiencies associated with compression ignition engines with the attractiveness of using gaseous fuel as the only fuel source for the engine. Furthermore, the present disclosure is specifically applicable to exploiting diffusion flame combustion and diesel cycle performance and efficiency with natural gas fuel, and doing so without the need of an additional fuel or the usual challenges of achieving effective ignition. Furthermore, by correctly sizing the gaseous fuel supply to the ignition fuel prechambers, engine 10, 110, 210 can also be further leveraged to have a limp home capability by supplying sufficient gaseous fuel to the ignition prechambers to power the engine at some reduced power level in case of a fault on the high pressure fuel injector side of the fueling system.

When in operation, the admission valve 41, 141, 241 may open as the engine intake valve is closing to provide a small charge of gaseous fuel in the ignition prechamber 14, 114, 214. After the admission valve 41, 141, 241 closes, the gaseous fuel mixes with fresh air as the piston 13, 113, 213 moves upward in the compression stroke. The mixture in the ignition prechamber 14, 114, 214 is ignited with the ignition device 30, 130, 230, maybe just prior to initiation of high pressure gaseous fuel injection from the individual fuel injectors 20, 120, 220. The combustion of the small gas/air mixture rapidly expands and pushes hot gases into the main combustion chamber of the individual cylinders 12, 112, 212. These hot gases may readily ignite the high pressure gas injection plumes subsequently injected from the fuel injectors 20, 120, 220 into the main combustion chamber providing a diesel-like diffusion combustion and heat release. Natural gas fuel venting issues may also be avoided in the engines of the present disclosure since any liquid natural gas boil off or high pressure gas leaks may be captured and routed to the low pressure gas system that is used for supplying gaseous fuel to the ignition prechambers 14, 114, 214.

Reiterating with regard to all of the engines of FIGS. 1-4, the method of operating the engine 10, 110, 210 includes moving gaseous fuel into one of the ignition prechambers 14, 114, 214 from a respective one of the gaseous fuel supply passages 31, 131, 231. Air is compressed in the cylinder 12, 112, 212 in at least a 14:1 ratio by moving one of the pistons 13, 113, 213 from the bottom dead center position to the top dead center position. The mixture of air and gaseous fuel in the ignition prechamber 14, 114, 214 is ignited using a respective one of the ignition devices 30, 130, 230. Gaseous fuel is injected from the fuel injector 20, 120, 220 directly into the engine cylinder 12, 112, 212. Gaseous fuel is moved from the gaseous fuel common rail 25, 125, 225 toward the fuel injector 20, 120, 220 responsive to the gaseous fuel injecting step. The injected gaseous fuel is ignited with hot gases pushed from the ignition prechamber 14, 114, 214 into the cylinder 12, 112, 212 responsive to the mixture igniting step.

Although the gaseous fuel may be supplied to the ignition prechambers 14, 114, 214 early in the compression stroke in order to promote thorough mixing with air, an alternative strategy may be utilized if a glow plug is utilized as the ignition device 30, 130, 230. In particular, if a glow plug is used, the gaseous fuel may only be supplied to the ignition prechamber in the vicinity of top dead center so that ignition timing is controlled by the opening of the admission valve 41 rather than by creation of a spark in the case of utilization of a spark igniter 135, 235. In particular, gaseous fuel may be moved into the respective ignition prechamber 14 when one of the pistons 13 is closer to top dead center than bottom dead center in case a glow plug is used, this fueling strategy might also be utilized if a different ignition device is employed in order to indirectly control how homogenous the mixture of gaseous fuel and air is allowed to become before being ignited in the respective ignition prechamber 14. In most instances, the step of injecting gaseous fuel may be performed after the mixture igniting step. In the embodiments of FIGS. 3 and 4 the mixture igniting step includes initiating the spark with a spark igniter. However, the present disclosure also contemplates the mixture igniting step being accomplished by activating a glow plug or a laser igniter or some other suitable ignition device known in the art.

In the case of the embodiment of FIG. 1, one could expect the electronic controller 15 to maintain the gaseous fuel common rail 25 at a high pressure and maintain the low pressure rail 40 at a lower pressure. Gaseous fuel is moved into the ignition prechamber 14 by moving gaseous fuel from the low pressure rail 40 into an opposite end 33 of one of the one of the gaseous fuel supply passages 31.

In the embodiments of FIGS. 3 and 4, movement of gaseous fuel into the ignition prechamber 114, 214 includes moving gaseous fuel from the gaseous fuel common rail 125, 225 toward the opposite end 133, 233 of the respective gaseous fuel supply passage 131, 231. Also with regard to the embodiments of FIGS. 3 and 4, movement of gaseous fuel into the respective ignition prechamber 114, 214 includes moving gaseous fuel within the individual fuel injector 120, 220. Finally, and also with respect to the embodiments of FIGS. 3 and 4, the mixture igniting step of igniting the mixture of gaseous fuel and air in the ignition prechamber 114, 214 is performed within the fuel injector 120, 220.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine comprising an engine housing that defines a plurality of cylinders;
   a plurality of pistons, each respectively positioned in one of the cylinders, and being movable between a bottom dead center position and a top dead center position that define a compression ratio greater than 14:1;
   a plurality of fuel injectors, each respectively positioned for direct injection into one of the cylinders;
   a plurality of ignition prechambers disposed in the engine housing, and each being respectively fluidly connected to one of the cylinders;
   a plurality of ignition devices, each respectively positioned in one of the ignition prechambers;
   a plurality of gaseous fuel supply passages disposed in the engine housing, and each respectively opening at one end into one of the ignition prechambers;
   a gaseous fuel common rail fluidly connected to each of the fuel injectors, wherein the gaseous fuel common rail is a high pressure gaseous fuel common rail; and
   a low pressure gaseous fuel common rail fluidly connected to an opposite end of each of the gaseous fuel supply passages.

2. The engine of claim 1 wherein the ignition devices are spark igniters.

3. The engine of claim 2 wherein each of the spark igniters includes an electrode separated from a tang by a spark gap; and
   the tang is exposed on an outer surface of the fuel injector.

4. The engine of claim 1 wherein the igniter devices are glow plugs.

5. The engine of claim 1 wherein the igniter devices are laser igniters.

6. The engine of claim 1 wherein an opposite end of each of the gaseous fuel supply passages is fluidly connected to the gaseous fuel common rail.

7. The engine of claim 6 wherein each of the gaseous fuel supply passages is located entirely within one of the fuel injectors.

8. The engine of claim 1 wherein each of the prechambers is disposed within one of the fuel injectors.

9. The engine of claim 1 wherein each of the fuel injectors includes a tip with an external surface that partially defines one of the prechambers.

10. A method of operating an engine that includes an engine housing that defines a plurality of cylinders;
    a plurality of pistons, each respectively positioned in one of the cylinders, and being movable between a bottom dead center position and a top dead center position that define a compression ratio greater than 14:1;
    a plurality of fuel injectors, each respectively positioned for direct injection into one of the cylinders;
    a plurality of ignition prechambers disposed in the engine housing, and each being respectively fluidly connected to one of the cylinders;

a plurality of ignition devices, each respectively positioned in one of the ignition prechambers;

a plurality of gaseous fuel supply passages disposed in the engine housing, and each respectively opening at one end into one of the ignition prechambers;

a gaseous fuel common rail fluidly connected to each of the fuel injectors, the method comprising:

maintaining the gaseous fuel common rail at a high pressure;

maintaining a low pressure rail at a low pressure;

moving gaseous fuel into one of the ignition prechambers from a respective one of the gaseous fuel supply passages;

compressing air in one of the cylinders in at least a 14:1 ratio by moving one of the pistons from the bottom dead center position to the top dead center position;

igniting a mixture of air and the gaseous fuel with one of the ignition devices in the one of the ignition prechambers;

injecting gaseous fuel from one of the fuel injectors directly into one of the cylinders;

moving gaseous fuel from the gaseous fuel common rail toward the one of the fuel injectors responsive to the injecting step; and igniting the injected gaseous fuel with hot gases pushed from the one of the ignition prechambers into the one of the cylinders responsive to the mixture igniting step, wherein the moving gaseous fuel into one of the ignition prechambers includes moving gaseous fuel from the low pressure rail into an opposite end of the one of the gaseous fuel supply passages.

11. The method of claim 10 wherein the mixture igniting step includes initiating a spark with a spark igniter.

12. The method of claim 10 wherein the injecting step is performed after the mixture igniting step.

13. The method of claim 10 wherein the mixture igniting step includes activating a glow plug.

14. The method of claim 13 wherein the step of moving gaseous fuel into one of the ignition prechambers is performed when the one of the pistons is closer to the top dead center position than the bottom dead center position.

15. The method of claim 10 wherein the mixture igniting step includes activating a laser igniter.

16. The method of claim 10 wherein the step of moving gaseous fuel into one of the ignition prechambers includes moving gaseous fuel from the gaseous fuel common rail toward an opposite end of the one of the gaseous fuel supply passages.

17. The method of claim 10 wherein the step of moving gaseous fuel into one of the ignition prechambers includes moving gaseous fuel within the one of the fuel injectors.

18. The method of claim 10 wherein the mixture igniting step is performed within the one of the fuel injectors.

* * * * *